United States Patent [19]

Smith

[11] Patent Number: 4,616,043

[45] Date of Patent: Oct. 7, 1986

[54] ALIPHATIC POLYURETHANE SPRAYABLE COATING COMPOSITIONS AND METHOD OF PREPARATION

[75] Inventor: Stuart B. Smith, Conyers, Ga.

[73] Assignee: Thermocell Development, Ltd., Knoxville, Tenn.

[21] Appl. No.: 727,776

[22] Filed: Apr. 26, 1985

[51] Int. Cl.$^4$ ................ C08G 18/14; C08G 18/77; C08G 18/30

[52] U.S. Cl. .................... 521/107; 521/161; 521/162; 528/49; 528/55; 528/59; 528/73; 523/214; 523/222; 524/494; 427/133

[58] Field of Search .......... 521/902, 107, 161, 162; 528/73, 59, 49, 55; 523/214, 222; 524/494, 847, 873

[56] References Cited

U.S. PATENT DOCUMENTS

| | | | |
|---|---|---|---|
| 4,218,543 | 8/1980 | Weber et al. | 521/117 |
| 4,267,299 | 5/1981 | Oechsle | 528/59 |
| 4,381,352 | 4/1983 | McBrayer | 521/115 |
| 4,381,388 | 4/1983 | Naples | 528/59 |
| 4,495,081 | 1/1985 | Vanderhider et al. | 252/182 |
| 4,560,494 | 12/1985 | Druetzler | 528/59 |

*Primary Examiner*—Herbert S. Cockeram
*Attorney, Agent, or Firm*—Richard P. Crowley

[57] ABSTRACT

A light stable, fast reacting, aliphatic polyurethane sprayable coating composition and injectable open molding material is prepared by reacting an A side composition comprising a trimerized or biuret polymethylene polyisocyanate prepolymer with a B side composition comprising an admixture of an alkoxy polyalkylene glycol, such as methoxypolyethylene glycol and an aromatic polyamine such as a diethyl toluene diamine to provide a polyurethane reaction product which rapidly gels, may be quickly removed from the mold, has good green strength and high temperature resistance and is characterized by good ultraviolet or light stability properties. Optionally, the B side composition may contain a catalytic amount of a metal carboxylate like lead napthenate. The A and B side compositions may be sprayed onto a mat in an open mold and also may be sprayed in conjunction with chopped glass fibers, to form a glass-fiber spray coating.

27 Claims, No Drawings

ALIPHATIC POLYURETHANE SPRAYABLE COATING COMPOSITIONS AND METHOD OF PREPARATION

BACKGROUND OF THE INVENTION

Polyurethane elastomer moldings having a surface skin have been prepared by a reaction mixture in a closed mold reaction injection molding (RIM) process by reacting polyether polymer triols and/or diols with aromatic chain extenders, such as diethyl toluene diamine and aromatic isocyanates, such as MDI (see for example U.S. Pat. No. 4,218,543, incorporated by reference). In this patent polyurethane elastomer moldings have been prepared employing aromatic diamines as chain extenders with aromatic isocyanates like 4, 4'-diiosocyanatodiphenylmethane polyisocyanates with a polyol having a molecular weight of from about 1800 to 12,000. Reaction injecting molding (RIM) requires large machines because of the fast reaction and gel times involved, while the presence of urea linkages in the resulting elastomeric product provides for higher heat distortion temperatures and green strengths. Most RIM parts employing the patent process require post curing and elaborate painting techniques, while the painted parts can easily scratch and chip requiring touchup work.

Solventless compositions for preparing sprayable polyurethanes and poly(urea)urethanes have been disclosed employing an isocyanate terminated prepolymer or a quasi-prepolymer prepared from aromatic isocyanates, such as TDI and MDI, as well as hexamethylene diisocyanate. The isocyanate prepolymer is reacted with a curing agent of a highly reactive polyol or polyamine or combinations thereof, including for example, a methylenedianiline curing agent. The reaction components are intimately admixed and sprayed through an atomizing nozzle onto a surface to produce the desired polyurethane or poly(urea)urethane coating which is essentially a solventless sprayable coating (see for example U.S. Pat. No. 4,267,299, incorporated by reference).

Polyurethane coatings have also been prepared by reacting an isocyanate prepolymer, such as a prepolymer based on 1-isocyanato-3,3,5-trimethyl-5-isocyanatomethylcyclohexane with a polyalkylene ether polyol together with a aromatic diamine, such as the aromatic diamines described in U.S. Pat. No. 4,218,543. The reaction mixture produces an elastomeric polyurethane coating which is essentially solvent-free or a low solvent coating composition.

SUMMARY OF THE INVENTION

The invention relates to aliphatic polyurethane coating and molding compositions and materials and a process of preparing such materials. In particular the invention concerns a light stable, fast reacting, aliphatic polyurethane, essentially solvent-free or low solvent sprayable coating composition or reaction molding material and the process of preparing such coatings and materials.

A light stable, fast reacting, aliphatic urethane composition particularly useful as a solvent-free or low solvent sprayable coating composition or as an injectable molding composition has been discovered. The process of preparing such compositions comprises reacting an A side composition which comprises 100 parts of a trimerized or biuret polymethylene polyisocyanate prepolymer, such as for example, a polyhexamethylene diisocyanate prepolymer for example, having from about 10 to 35 percent by weight NCO groups with up to a stoichiometric amount or a slight excess of a B side composition. The B side composition comprises an admixture of an alkoxy polyalkylene glycol, such as for example, a methoxypolyethylene glycol, for example having a molecular weight of from about 300 to 550 and an aromatic amine, such as for example a diamine, like an aromatic diamine, for example with at least two alkyl substituent groups ortho to each amino group and optionally a methyl group ortho to each amino group and more particularly diethyl toluene diamine.

The reactive process provides a polyurethane reaction product which may be sprayed onto a substrate or injected into a open or closed mold, and which reaction mixture gels rapidly, typically in less than for example 10 seconds, which may be removed from a mold; that is, demolded for example in 15 minutes or less and yet has high green strength on demolding and has a high temperature resistance together with good light stability. In particular, it has been found that the combination of the toluene diamine with the trimerized or biuret hexamethylene diisocyanate or combinations thereof with the methoxypolyethylene glycol produces an excellent light stable, fast reacting open molding or sprayable coating material.

It has been discovered that the employment of the alkoxy polyalkylene glycols in combination with the diamine chain extenders in a reaction with a trimerized or biuret aliphatic polyisocyanate permits the reaction to proceed in a different manner and nature than the aromatic diamine reaction with a diol or triol system with an aromatic diisocyanate. While not wishing to be bound by any particular theory of operation or mechanism, it is probable or it may appear that the high solubility of the methoxypolyethylene glycol and its capped end permits the reaction to proceed in a different manner, so that the reaction is a fast reaction with a resulting high strength material. It has been found that when a diol or triol system is used, for example, with diethyl toluene diamine as a chain extender with a trimerized or biuret hexamethylene diisocyanate a slow reaction occurs and the resulting product does not have good green strength or acceptable heat distortion temperatures. Thus, it is found that only in the combination of an alkoxy polyalkylene glycol, such as the methoxypolyethylene glycol with the aromatic diamines and the aliphatic isocyanate is a light stable, fast reacting, aliphatic polyurethane material produced.

The aliphatic polyisocyanate suitable for use in the invention comprises those trimerized or biuret aliphatic such as polyalkylene particularly polymethylene polyisocyanates and more particularly, a trimerized or biuret hexamethylene diisocyanate. The polymethylene polyisocyanates have free NCO groups or combinations of the trimerized and biuret polyisocyanates and typically up to about 35 percent by weight of the free NCO groups, such as for example from about 5 to 35 and more particularly 18 to 30 percent by weight of free NCO groups. The trimerized or biuret aliphatic prepolymers are prepared by reacting the selected polymethylene polyisocyanate in the presence of one or more catalysts to prepare the prepolymer reaction product. Trimerized or biuret products having high solid contents for example 80 to 100 percent solids with low viscosities, for example less than about 2500 cps and low odors are preferred. If desired small amounts of solvent or diluent may be employed, such as for example small amounts, such as 25 percent by weight or less of an aliphatic solvent or a combination of aliphatic and aromatic solvents may be employed, although are not preferred.

Where the prepolymer or combinations thereof have high viscosities such as over 5000 cps which makes mixing and pumping of the composition difficult, it has been found that the addition of small amount of high boiling point, viscosity reducing organic compounds may be added to reduce the viscosity. Such viscosity reducing compounds should have a boiling point of about 140° C. or more to avoid gassing during the reaction. It has been discovered that about 5 to 40 parts by weight, for example 20 to 35 parts by weight of a polyalkylene glycol ester such as an acetate, particularly tripropylene glycol acetate added to the A side composition effectively reduces viscosity (e.g. to 1000-2500 cps), avoids gassing, and provides a better gloss on the resulting reaction product.

The alkoxy polyalkylene glycols are employed in amounts sufficient to provide the desired degree of flexibility or rigidity to the resulting reaction product with increased amounts of the alkoxy polyethylene glycol leading to a more rigid reaction product while lower amounts lead to a more flexible product.

The alkoxy polyalkylene glycols useful in the invention have the structural formula:

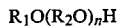

$$R_1O(R_2O)_nH$$

wherein $R_1$ is a lower alkyl group, such as a methyl, ethyl or propyl group, and $R_2$ is a di or tri methylene group; for example, ethylene or propylene group, and n is a number from about 3 to 20; for example 4 to 10, with the preferred glycol being methoxypolyethylene $C_1-C_3$ poly $C_1-C_3$ alkylene glycols. The glycol typically is a liquid with an average molecular weight of less than about 600; for example, 275 to 550. The alkoxy polyalkylene glycols useful in the invention include, but are not limited to, methoxypolyethylene glycol, methoxypolypropylene glycol, ethoxypolypropylene glycol and mixtures and combinations thereof. It has been found that the use of the MPEG in the reaction mixture aids in retaining fluorocarbon blowing agents and other similar additives where employed and tends to enhance the char resistance of the resulting reaction product.

The diamine employed in combination with the alkoxy polyalkylene glycol should be an aromatic chain extender and particularly an alkyl-substituted aromatic diamine, and more particularly those aromatic diamines as described in U.S. Pat. No. 4,218,543 and even more particularly the aromatic diamines which are miscible with the alkoxy polyalkylene glycols and which comprise at least one alkyl substituent, e.g. $C_1-C_3$ in the ortho position to a first amino group and two alkyl substituents in an ortho position to a second amino group or mixtures of such aromatic diamines. A specially preferred aromatic diamine for use in the invention comprises a dialkyl toluene diamine, such as a diethyl toluene diamine (DEDTA). The polyamine used should provide for reaction after about 5 seconds to 3 minutes, e.g. 10 seconds to 2 minutes.

It has also been discovered that the optional use of small catalytic amounts of metal carboxylate catalysts are useful in providing improved strength to the reaction products, particularly after aging of the products. Multivalent metal organic carboxylates such as tin and lead may be used in the B side composition in minor amounts, such as from about 0.01 to 1.0 parts by weight per 100 parts of the prepolymer. Typical carboxylates include, but are not limited to napthenates such as lead napthenate, and fatty acid and alkyl-fatty acid metal compounds such as lead octoate, dibutyltin dilaurate and the like. The lead carboxylates are preferred catalytic agents, since tin carboxylates tend to provide more gassing in the reaction mixture.

The reaction may be carried out in the presence of other additives, such as for example in the presence of selected flame retardants or flame suppressant agents, such as phosphate or halogenated compounds, halogenated phosphate compounds or alumina trihydrate in amounts of up to 20 percent by weight of the composition and more particularly 2 to 10 percent by weight. In addition, the reaction may be carried out in the presence of a sufficient amount of a blowing agent to provide a foam product and typically such a blowing agent would comprise a liquid halocarbon, such as a fluorocarbon and more particularly a chlorofluoromethane or ethane, such as fluorotrichloromethane so as to provide a closed-cell foam reacting composition. A blowing agent may be employed in a sufficient amount to provide the desired density, such as from 2 to 30 pounds density ranging from about 1 to 20 parts of a blowing agent for 100 parts of the trimerized aliphatic polyurethane employed; for example, from about 5 to 15 parts. Where a blowing agent is employed, there is is also generally employed a surfactant or cell-control agent, typically a silicone surfactant or a silicone glycol surfactant in an amount ranging from 0.5 to 3 parts of the trimerized aliphatic polyurethane.

Other additives as desired may be used, such as for example, but not limited to: catalysts, solvents, diluents, such as toluene, xylene, ethylene acetate glycol, moisture scavenging agents, accelerators, antioxidants, coupling agents, flame retardants, stabilizers, lubricants, surfactants, viscosity control agents, plasticizers biocides, antistatic agents, polymeric and resin additives, and fiberous reinforcing agents, such as chopped glass fibers, fillers, pigments, dyes, and the like.

The aliphatic polyurethane reaction product is prepared by mixing the components directly together generally at room temperature; for example, 50° to 80° F., such as by spraying the components together or injecting the components onto the surface of an open mold or onto a closed mold to provide an exothermic reaction and the production of the resulting aliphatic, light stable, polyurethane reaction product. The A side composition comprises the trimerized or biuret polymethylene diisocyanate together with any other components compatible therewith, such as a viscosity adjusting agent. The B side composition comprises the alkoxy polyalkylene glycol in admixture with the diamine chain extender and together with other components typically added to the B side such as the metal carboxylate or other catalyst surfactants, blowing agents, and the like. Where reinforcing fibers, fillers or pigments are employed, these may be incorporated in the B side mixture or sprayed directly into the reaction mixture with a separate nozzle or the reaction mixture of A and B may be sprayed directly onto the mat of the reinforcing fibers, such as with the use of glass fibers in a mold set-up.

Generally, the components A and B are placed in separate containers and then are sprayed by a variable or fixed equal-volume spray nozzle together onto a substrate or into an open or closed mold. Where a solid coating or a solid elastomer RIM product is desired, the reaction is carried out in the absence or substantial absence of any moisture or blowing agent to provide for a solid RIM product or coating composition of desired properties and thickness. However, if desired, a blowing agent and a surfactant may be incorporated to provide for a coating or a foam molded product. The reaction mixture may be sprayed, poured or injected to produce solid or foam coatings or moldings on a variety of substances, such as on glass or synthetic fibers or- woven or non-woven substrates to produce mats or a coated natural metal foil, like aluminum foil, wood, steel or other surfaces. If desired, where the reaction mixture is applied to a surface coating or substrate, the surface coating or substrate may be preheated prior to the application of the reaction mixture, particularly if a thin coating or mold foam is desired. The reaction mixture is particularly characterized by a fast cure time, and light stable, elastomeric, aliphatic polyurethane coatings and mold products.

The B side composition must contain in combination the alkoxy polyalkylene glycol in combination with a diamine. The amount of the respective components in the B side mixture may vary and typically should have a total stoichiometric amount of glycol and amine in or slightly above a stoichiometric amount. For example, about 10 to 100 parts of the aromatic diamine, for example, 10 to 50 parts by weight are employed per 100 parts of the aliphatic diisocyanate. As the level of the alkoxy polyalkylene glycol in the admixture, such as MPEG is increased, the resulting elastomeric reaction product is more flexible, while lower levels of MPEG provide a more rigid reaction product. For example, 10 to 150 parts by weight, such as 20 to 80 parts of MPEG may be used for 100 parts by weight of the trimerized prepolymer. For example, in employing a diethyl toluene diamine, one part of the DEDTA, reacts with two parts of the polymethylene diisocyanate. In practice additional components may be added to the B side mixture, such as a 5 to 20 parts of flame retardant to impart flame retardance and improved fire resistant properties to the resulting product or blowing agents and surfactants or other additives as desired.

Spraying or injecting the components A and B together provides for a light stable, aliphatic polyurethane reaction product with a fast gelling time, typically less than, for example 20, such as 15–10 seconds, and which when sprayed in an open mold may be demolded in less than, for example, 3 to 4 minutes with good green strength and high temperature resistance of the product. In one embodiment the reaction mixture may be sprayed or injected onto a layer of fiberglass, for example, in 50 to 100 mils thickness and then successive layers built-up on top of the sprayed layer employing, for example, ¼ inch chopped fiberglass sprayed into the reaction mixture to provide a light stable, soft, flexible, thin or high density molded product.

The invention will be described for the purposes of illustration only in connection with certain illustrative embodiments; however, it is recognized that various changes, additions, and improvements may be made by those persons skilled in the art all falling within the spirit scope of the invention.

EXAMPLE 1

As an illustration of an aliphatic polyurethane product of the invention, A and B side component mixtures were prepared and the two components were placed in separate tanks under 3 psi dry air pressure. The A and B side components were then pumped through rotating piston pumps at 400 psi and sprayed together onto an open mold. The reactive materal gelled in 6 seconds and was demolded in 2 minutes as a solid coating. The reactive material was flexbile with excellent gloss, high green strength, and temperature resistance even freshly molded. No mold release agent was needed to release the reactive material using either polyester or aluminum molds. The A and B side components were as follows;

A side: 75 parts by weight biuret hexamethylene diisocyanate prepolymer, (L-2291 A a product of Mobay Chemical Corporation) a biuret hexamethylene diisocyanate of 100 percent solids with low viscosity, about 2000 cps, and low odor having a free percent NCO content of 22 percent by weight).

B side: 25 parts by weight of diethyl toluene diamine, 75 parts by weight of methoxypolyethylene glycol MPEG (having a molecular weight of 550 and a hydroxyl number of 100, and 0.02 parts of a 36 percent lead napthenate catalyst).

EXAMPLE 2

A reactive aliphatic polyurethane was prepared as in Example 1 using the same spraying conditions, except as follows:

A side: 58 parts by weight of hexamethylene diisocyanate (L-2291).

B side: 25 parts by weight diethyl toluene diamine and 25 parts by weight methoxypolyethylene glycol MPEG (550 MW). The resulting material gelled in 6 seconds and was demolded as in Example 1 in 2 minutes. The product was rigid with excellent green strength and no mold release agent was used to release the material from the mold. Although the reaction product produced was very rigid due to the low level of the MPEG, there were no signs of brittleness in the resulting product.

EXAMPLE 3

Example 1 is repeated to prepare a flame retardant, aliphatic polyurethane reaction product by adding 10 parts by weight to component B of Antiblaze 80, a trichloroethyl phosphate from Mobil Chemical Company.

EXAMPLE 4

A closed cell, flexible, skinned aliphatic polyurethane foam product is prepared having a density of about 10 pounds per cubic foot with fine cells by adding 10 parts by weight of Freon 11 (Dupont Co.) to component B together with one part by weight of a silicone surfactant, (5422 surfactant of Union Carbide Corporation) to component B to prepare an elastomeric fine cell reaction foam material.

EXAMPLE 5

A reactive mixture was prepared under the same spraying conditions as in Example 1 wherein the A side component comprised 50 parts by weight of the diisocyanate (L-2291 A) and the B side component comprised solely 25 parts by weight of diethyl toluene diamine. In this formulation the MPEG was removed and the A and B components sprayed under the same conditions as Examples 1 and 2 to produce a rigid product in the same cycle as Example 2; however, without effective mold release. After curing a very hard, brittle reaction product resulted which was not satisfactory indicating that the B side component should contain MPEG to control the flexibility-rigidity characteristics of the resulting product.

EXAMPLE 6

A 4000 molecular weight triol was used in combination with the diethyl toluene diamine in the absence of MPEG, and which composition would represent a compositon typically useful in standard aromatic MDI RIM molding apparatus and techniques. The A side mixture comprised 55 parts by weight of hexamethylene diisocyanate (L-2291 A) and the B side mixture comprised 75 parts by weight of a 4000 molecular weight triol (Union Carbide 443) and 25 parts by weight of diethyl toluene diamine. The reactive components A and B were sprayed under the same molds and conditions as in Example 1 and 2 with the gel time being 2 minutes, while the demolding time was 10 minutes. The resulting reaction product was rubbery with poor tear strength. After a post cure time of 30 minutes, the strength was improving; however, the strength did not approach the green strength of the reaction product as prepared in Example 1. This example indicates that a triol may not be substituted for the MPEG in Example 1 and 2. All examples were tried in polyester and aluminum-type molds, such as molds used in the standard RIM techniques in RIM molding machines with the same results as reported above.

EXAMPLE 7

The previous Example 6 was repeated employing a 2000 molecular weight diol; however, the same results as reported in Example 6 were obtained.

EXAMPLE 8

Examples 1 and 2 were carried out employing as a trimerized tetramethylenexylene diisocyanate prepolymer (American Cyanamid Company P- and M- TM XDI) as a substitute for the L-2291 A in Examples 1 and 2 with modifications made in accordance with the amount of free NCO groups of the prepolymer. The resulting reaction mixture had a long cure time of 15 minutes to gel and 30 minutes to cure with poor product strength and with the reaction product sticking in both the aluminum and polyester molds.

EXAMPLE 9

Example 1 was repeated employing a trimerized hexamethylene diisocyanate prepolymer (N-100, a product of Mobay Chemical Corporation) in place of the biuret aliphatic diisocyanate prepolymer L-2291 A (which contains NCNH groups) in the A side composition. The reaction profile was similar to that of Example 1 as was the results, except the reaction product was more rigid upon curing.

EXAMPLE 10

Example 9 was repeated, but 25 parts by weight of tripropylene glycol acetate was added to the A side composition to reduce the viscosity of the trimerized prepolymer (originally about 10,000 cps) to about 2000 cps. The resulting reaction product was more flexible.

The foregoing examples illustrate that it is essential to provide for the reaction of a trimerized or biuret polymethylene diisocyanate together with a combination of an alkoxy polyalkylene glycol, such as MPEG with an aromatic diamine, such as diethyl toluene diamine in order to obtain the benefits of a light stable, fast reacting, fast gelling, high green strength, high temperature resistance, aliphatic urethane reaction product.

What is claimed is:

1. A process for preparing a light stable, fast reacting, aliphatic polyurethane product, which process comprises admixing and reacting an A side and a B side composition as a reaction mixture, the A side composition comprising 100 parts of a trimerized or biuret polymethylene polyisocyanate prepolymer having free NCO groups and a B side component composition comprising an admixture of an alkoxy polyalkylene glycol and an aromatic diamine, wherein the aromatic diamine is present in a chain-extending amount of from about 10 to 50 parts by weight per 100 parts by weight of the prepolymer, and the alkoxy polyalkylene glycol is present in an amount of from about 10 to 150 parts by weight of the prepolymer, to provide a fast reacting, aliphatic polyurethane reaction product.

2. The process of claim 1 wherein the polymethylene polyisocyanate comprises a hexamethylene diisocyanate prepolymer.

3. The process of claim 1 wherein the aromatic diamine comprises a dialkyl toluene diamine.

4. The process of claim 1 wherein the aromatic diamine comprises a diethyl toluene diamine.

5. The process of claim 1 wherein the alkoxy polyalkylene glycol comprises a methoxypolyethylene glycol or methoxypolypropylene glycol.

6. The process of claim 1 which includes adding to the reaction mixture a flame retardant amount of a flame retardant agent.

7. The process of claim 6 wherein the flame retardant agent comprises a flame retardant compound selected from the group consisting of a halogenated compound, a phosphate compound or a halogenated phosphate compound.

8. The process of claim 1 which includes adding to the reaction mixture a blowing amount of a blowing agent and a surfactant to provide a foam reaction product.

9. The process of claim 1 wherein the alkoxy polyalkylene glycol comprises methoxypolyethylene glycol in an amount ranging from about 20 to 80 parts by weight per 100 parts of the prepolymer.

10. The process of claim 1 wherein the B side composition includes a catalytic amount of a metal carboxylate.

11. The process of claim 10 wherein the metal carboxylate comprises lead napthenate in an amount of 0.01 to 1.0 parts by weight per 100 parts of the prepolymer.

12. The process of claim 1 wherein the A side composition includes a viscosity reducing amount of a polyalkylene glycol acetate.

13. The process of claim 12 wherein the polyalkylene glycol acetate comprises tripropylene glycol acetate in an amount to reduce the viscosity of the A side composition to about 2500 cps or less.

14. The process of claim 1 wherein the reaction product gels in less than about 20 seconds and which has good green strength and which may be removed from a mold within 5 minutes or less.

15. The process of claim 1 which includes reacting composition A and composition B together by spraying composition A and B together onto a substrate surface.

16. The process of claim 15 which includes incorporating into the sprayed reaction mixture a fiber strengthening amount of a fibrous material.

17. The process of claim 16 wherein the fibrous material comprises chopped glass fibers.

18. The process of claim 1 which includes reacting composition A and composition B together by spraying compositions A and B together onto the surface of an open mold.

19. The reaction product produced by the process of claim 1.

20. The reaction product produced by the process of claim 15.

21. A process for preparing a light stable, fast reacting, aliphatic polyurethane reaction product, which process comprises admixing and reacting together an A side composition comprising 100 parts by weight of a trimerized or biuret hexamethylene diisocyanate prepolymer having up to about 35 percent by weight of free NCO groups with a B side composition comprising an admixture of a methoxypolyethylene glycol and an aromatic diamine, wherein the aromatic diamine is present in a chain-extending amount of from about 10 to 50 parts by weight per 100 parts by weight of the prepolymer, and the alkoxy polyalkylene glycol is present in an amount of from about 10 to 150 parts by weight of the prepolymer, to provide a polyurethane reaction product which gels in less than about 20 seconds and has good green strength.

22. The process of claim 21 wherein the aromatic diamine comprises diethyl toluene diamine.

23. The process of claim 21 wherein the methoxypolyethylene glycol comprises from about 20 to 80 parts per 100 parts of the trimerized prepolymer.

24. The process of claim 21 wherein the A side composition includes from about 5 to 40 parts by weight per 100 parts of the prepolymer of tripropylene glycol acetate.

25. The process of claim 21 wherein the B side composition includes from about 0.01 to 1.0 parts by weight of a lead carboxylate catalyst per 100 parts by weight of the prepolymer.

26. The process of claim 21 which includes spraying compositions A and B together onto a glass fiber mat on an open mold substrate and removing the glass fiber-containing reactive product from the mold.

27. The reaction product prepared by the process of claim 21.

* * * * *